United States Patent [19]

Long

[11] Patent Number: 5,428,641
[45] Date of Patent: Jun. 27, 1995

[54] DEVICE AND METHOD FOR UTILIZING ZERO-PADDING CONSTELLATION SWITCHING WITH FRAME MAPPING

[75] Inventor: Guozhu Long, Canton, Mass.

[73] Assignee: Motorola, Inc., Schaumburg, Ill.

[21] Appl. No.: 97,343

[22] Filed: Jul. 23, 1993

[51] Int. Cl.$^6$ ............................................. H04L 27/04
[52] U.S. Cl. ........................................ 375/295; 371/43
[58] Field of Search ..................... 375/17, 69, 39, 42, 375/94; 371/37.8, 43

[56] References Cited

U.S. PATENT DOCUMENTS

| | | | |
|---|---|---|---|
| 4,597,090 | 6/1986 | Forney, Jr. | 375/39 |
| 4,807,253 | 2/1989 | Hagenauer et al. | 371/43 |
| 5,029,185 | 7/1991 | Wei | 375/27 |
| 5,233,629 | 8/1993 | Pair et al. | 375/39 |

Primary Examiner—Young Tse
Attorney, Agent, or Firm—Darleen J. Stockley

[57] ABSTRACT

A device (500) and method (400) for zero-padding constellation switching with frame mapping provides reduced complexity for mapping frames having possibly a fractional number of bits and a predetermined number of symbols while eliminating the usual disadvantages of constellation switching.

8 Claims, 2 Drawing Sheets

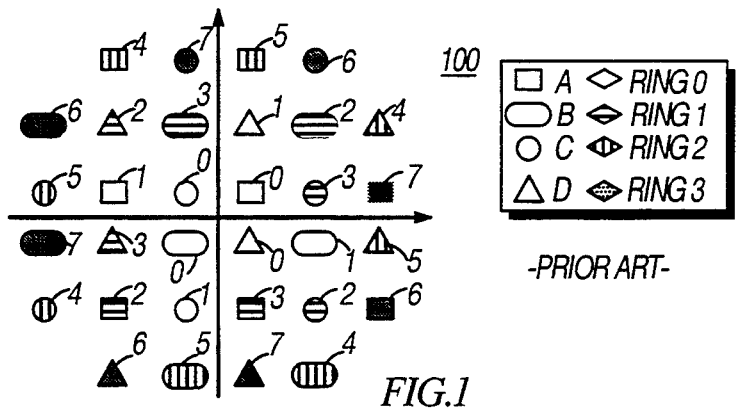
FIG.1 -PRIOR ART-
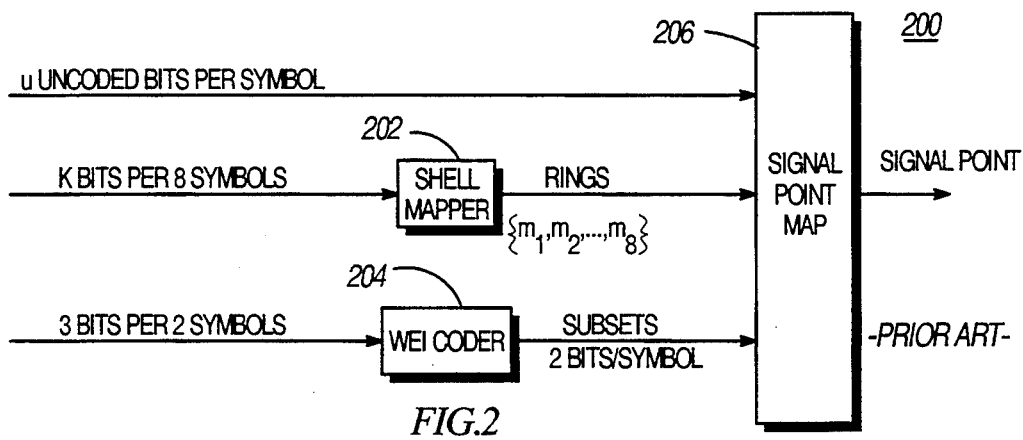
FIG.2 -PRIOR ART-
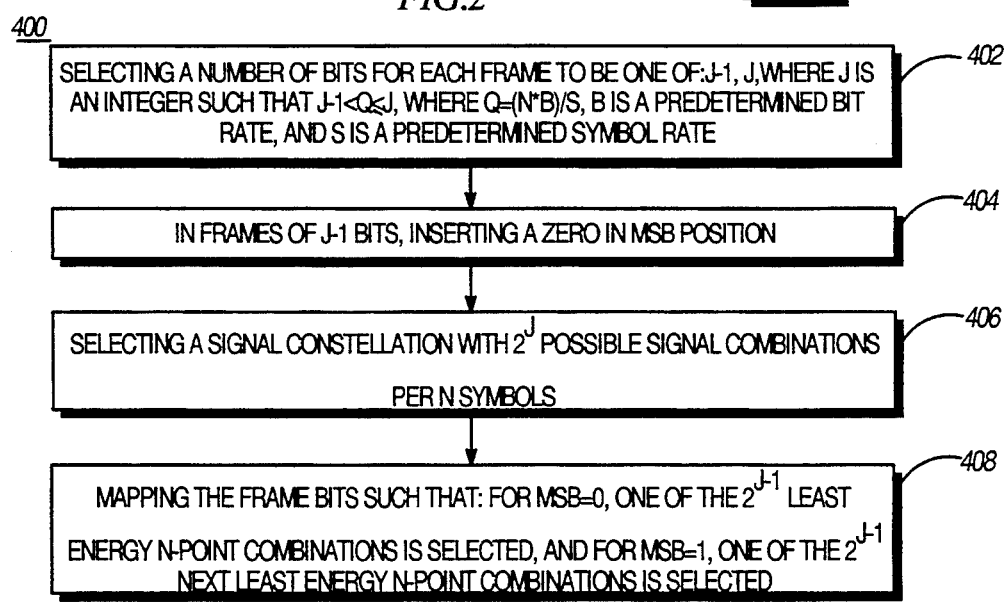
FIG.4
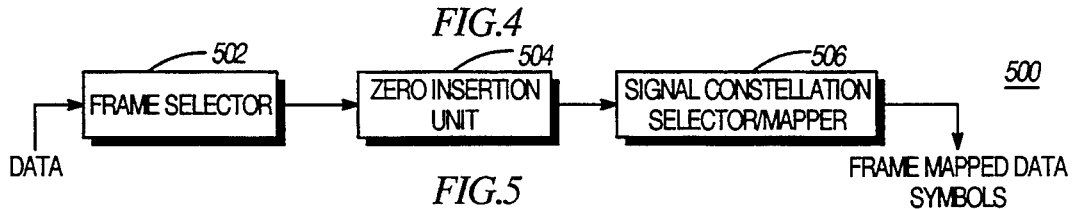
FIG.5

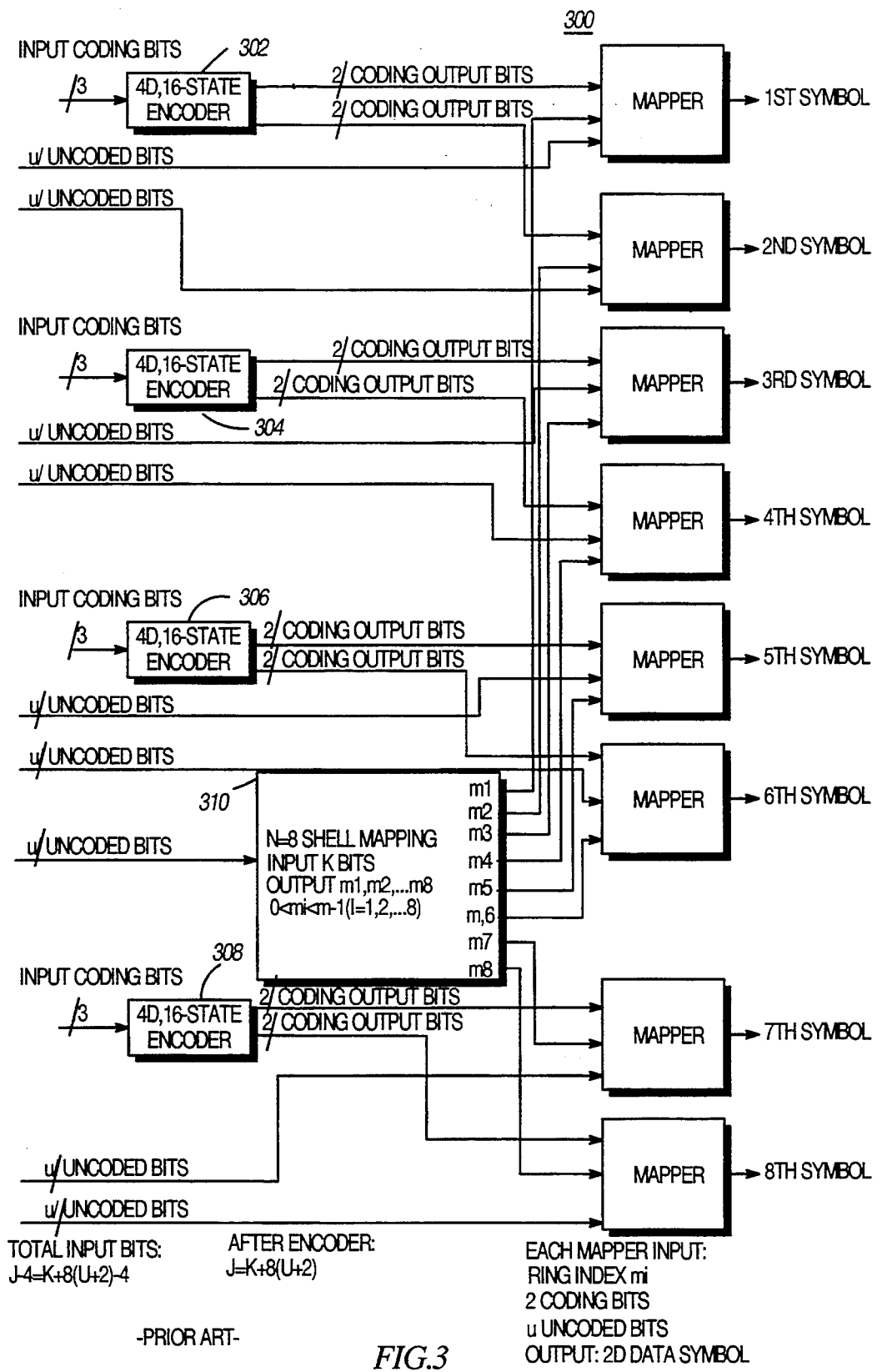
FIG.3 -PRIOR ARTund
DEVICE AND METHOD FOR UTILIZING ZERO-PADDING CONSTELLATION SWITCHING WITH FRAME MAPPING

FIELD OF THE INVENTION

The present invention relates generally to digital communication devices and methods, and more particularly to mapping a digital data sequence for transmission in a digital communication system.

BACKGROUND

Modems are typically utilized for transmitting and receiving digital data communication from computer systems. Typically, data is expressed in a binary form. Data is transmitted at a bit rate, e.g., B bits per second, where the bit rate is defined as the number of bits to be transmitted and received, including the actual binary information data rate and a predetermined redundancy needed by coding in a selected system. During transmission, the binary data information is typically transmitted and received in a form of a series of symbols at a symbol rate of S symbols per second. Thus, each symbol contains B/S bits of binary data.

Each symbol can be represented by one of the possible line signal states generated by the modem. Various modulation techniques may be used to convert data into line signal states. For example, in quadrature amplitude modulation (QAM), The line signal states can be represented by a set of complex numbers, namely by a set of points in a two-dimensional signal constellation. For example, for a bit rate B and a symbol rate S, where B/S is an integer D, a signal constellation of size $2^D$ is needed to represent D bits in each symbol. Thus, if B=12000 bits/second and the symbol rate S is 2400 symbols/second, D=5 bits/symbol, and a 32-point two-dimensional signal constellation is used, providing a scheme for mapping one out of 32 possible complex signal points according to 5 input data bits.

However, for high speed modems, multiple symbol rates and bit rates may be used to facilitate more efficient use of the available channel bandwidth. In such instances, the ratio B/S may not be always an integer.

Where B/S is not an integer, the modem transmits a fractional number of bits per symbol. Various techniques have been used to accomplish transmission of a fractional number of bits per symbol. In the constellation switching technique, for example, where $D-1 < B/S < D$, the modem switches between D-1 bits/symbol and D bits/symbol such that, on an average, the modem sends B/S bits per symbol. Namely, the modem switches between a signal constellation with $2^{D-1}$ points and another signal constellation with $2^D$ points.

The main disadvantages of constellation switching are the introduction of a variation in constellation size and an increase in peak-to-average power ratio due to the increase in constellation size. This is undesirable in many applications, especially when the communication channel introduces signal-dependent impairments such as harmonic distortion and pulse coded modulation (PCM) noise. In addition, constellation switching often complicates the modem implementation.

In contrast to one symbol by one symbol mapping techniques, frame-mapping techniques may be used.

Since B/S is usually a rational number, there exists a number N such that Q=N*B/S is an integer, i.e., the number of bits in a frame of N symbols is an integer. A frame-mapping algorithm maps the incoming Q bits to N symbols chosen from a signal constellation with a sufficiently large number of points. Compared with the constellation required by symbol-based constelation switching (with $2^D$ points), frame-mapping techniques usually require a relatively small constellation, and thus a small peak-to-average power ratio. However, such techniques generally introduce complexity where a large N is used. Examples of frame-mapping techniques include modulus conversion and shell mapping.

Since multiple B and S values are often selected, there is often difficulty in selecting a reasonably small N such that Q=N*B/S is always an integer for all possible combinations of B and S. In some instances, a different N may be selected for different combinations of B and S, thereby further complicating the implementation of the mapping algorithm. Another approach is to transmit a fractional number of bits per frame, i.e., using a fixed N in conjunction with a constellation switching among frames. Both approaches provide more implementation complexity.

Hence, there is a need for a frame-mapping device and method which maps data that is transmitted at fractional bits per frame rate such that the implementation difficulties of constellation switching are avoided.

BRIEF DESCRIPTIONS OF THE DRAWINGS

FIG. 1 is an exemplary signal constellation, as is known in the art.

FIG. 2 is a block diagram of a shell mapper as is known in the art.

FIG. 3 is a block diagram of a 4 dimensional/16-state encoder that is configured for shell mapping with N=8, as is known in the art.

FIG. 4 is a flow chart showing the steps of an embodiment of the frame-mapping method of the present invention.

FIG. 5 is a block diagram of a frame-mapping device in accordance with an embodiment of the present invention.

DETAILED DESCRIPTION OF A PREFERRED EMBODIMENT

The present invention provides an advantage for mapping frames of data which would otherwise require constellation switching by utilizing a scheme of selecting first and second frame sizes for data, zero-padding the data for the first frame size such that the first frame is equal to the second frame size, and frame mapping the data.

This scheme is particularly advantageous in that it eliminates the necessity for constellation switching when Q, an average number of bits per frame of N symbols where Q=N,B/S (N is a predetermined integer, B is a number of bits per frame, S is a symbol rate) is expressible in a form of an improper fraction, hereafter referred to as fractional.

Where a frame-mapping technique is used to map a frame of Q=N*B/S bits into N symbols, if Q, the number of bits in a frame of N symbols, is an integer, a frame-mapping algorithm maps the incoming Q bits to N symbols chosen from a signal constellation with a sufficiently large number of points. Examples of frame-mapping techniques include modulus conversion and shell mapping.

In shell mapping, the selected signal constellation is divided into M equal size "rings" each of which contains R signal points. R is typically chosen to be $2^v$, where v is an integer greater than or equal to zero. Among Q bits, $K=Q-(N,v)$ bits, are used for shell mapping, generating N ring indices ranging from 0 to M-1. In each symbol, one of these ring indices is used to choose one of the M rings in the signal constellation, and v bits are used to choose one of the $2^v$ points within that ring. If a convolutional encoder is employed, among v bits, c bits are coding bits which are the output of the convolutional encoder, and are used to select one of the $2^c$ subsets, and the remaining $u=v-c$ bits are used to select one of the $2^u$ points in the chosen subset in the chosen ring. When no convolutional encoder is employed, $c=0$ and $u=v$.

For example, for a 4-dimensional 16-state code, $c=2$, and the constellation is partitioned into $2^c=4$ equal-sized subsets A,B,C and D. The constellation is also partitioned into M equal-sized rings, each of which contains $2^{u+c}$ points, of which $2^u$ points are from each subset. Ring 0 contains the $2^u$ lowest energy points from each subset, ring 1 contains the $2^u$ next lowest energy points from each subset, and so on. An exemplary 32 point signal constellation is shown in FIG. 1, numeral 100, where L=32, c=2, u=1 and M=4. These 32 points may be divided into 4 rings (shown as rings 0 (unshaded), 1 (shaded with horizontal lines), 2 (shaded with vertical lines), 3 (dotted)), each of which consists of 8 points (indexed 0-1, or 2-3, or 4-5, or 6-7) of which 2 points are from each subset. The energy of the signal point is non-decreasing as the index increases. The collection of all 32 points with index 0 to 7 is approximately within a circle.

The constellation size is $L=M*2^{u+c}$.

Shell mapping uses $K=Q-(N*v)$ bits to generate N ring indices $m_i$ (i=1,2, . . .N) ranging from 0 to M-1. In order to select the N-tuple $\{m_1, m_2, \ldots m_N\}$ using the K bits, first a "cost" is assigned to each ring. Since a main purpose of an efficient mapping scheme is to achieve a low average signal power, the average signal power within a ring is assigned as its "cost". However, for computational convenience, the "cost" is set to the ring index. Thus, the innermost ring has cost 0, the next ring has cost 1, and so on. This approximation is quite workable, in particular as the constellation becomes larger. Since costs are additive, the total costs of N symbols is $m_1+m_2\ldots+m_N$. Note that there are $M^N$ combinations of N ring indices, but only $2^K \leq M^N$ input K bit combinations. Thus, certain combinations of rings will be excluded. An efficient shell mapping scheme minimizes the cost by selecting the $2^K$ combinations that have the least total cost. If the input K bits is expressed as a number X, an efficient shell mapping algorithm ensures that as X increases, the corresponding total cost is non-decreasing. As a result, when the most significant bit in the incoming K bits is 0, one of the $2^{K-1}$ combinations with least total costs will be selected; and when the most significant bit in the incoming K bits is 1, one of the $2^{K-1}$ combinations with next least total costs will be selected. It is this property that makes this invention possible.

The integer M is chosen such that $2^K \leq M^N$. The smallest integer for M that satisfies this condition is defined as $M_{min}$.

When $M=M_{min}$, the constellation size is $L=M_{min}*2^{u+c}$, which is in general smaller than the constellation size required by symbol-based constellation switching, thus the peak power is reduced. When M is selected such that $M>M_{min}$, the difference between $2^K$ and $M^N$ is larger. Interestingly, in this case, the $2^K$ least energy ring index combinations will have a smaller average total cost. Thus, using the shell mapping algorithm with a larger than the minimum constellation allows reduction of the average cost (shaping gain) at the expense of constellation expansion.

The shell mapping scheme establishes a 1-1 mapping between K binary bits and an N-tuple $\{m_1, m_2, \ldots m_N\}$. Though this mapping may be done using a table look-up, such a mapping table is often too large to be practical. Instead, some efficient mapping algorithms can be used to achieve the mapping such as the shell mapping technique set forth below.

Since multiple B and S values are often selected, there is often difficulty in selecting a reasonably small N such that $Q=N*B/S$ is always an integer for all possible combinations of B and S. One approach is to fix N for all the cases, but this requires transmitting a fractional number of bits per frame in some of the cases.

Where Q is fractional, an integer value J can always be selected such that $J-1<Q \leq J$. J-1 bits are transmitted in some of the frames and J bits are transmitted in the rest of the frames to achieve an average rate of Q bits per frame. Conventional, this requires a constellation switching among frames. Using the scheme of the present invention, such a constellation switching can be avoided.

The values for J-1 and J represent first and second frame sizes, i.e., number of bits per frame, for incoming data. The key to the invention is that only one signal constellation is selected that is suitable for mapping J bits/frame. That is, a signal constellation has at least $2^J$ possible signal point combinations per N symbols, i.e., providing transmission of J/N bits per symbol. The frame mapping of the data to the signal points provides that where, in the transmitted data frame, the most significant bit (MSB) of the J bits is equal to zero, one of the $2^{J-1}$ least energy combinations of N signal points is selected. In frames having only J-1 bits, a zero is inserted at the MSB position such that the J-1 bits frame then contains J bits. The frame mapping scheme is the same for all frames of data, ensuring a less complex implementation than if constellation switching were utilized to achieve mapping for a fractional bit/frame rate. Typical values for N are integers 2 and greater. This scheme is particularly useful for frame sizes of 4 or greater.

Further, where the frame mapping is shell mapping, the present invention is very efficient in providing a minimized constellation expansion and a small average signal power.

To further explain shell mapping, the following exemplary shell mapping technique describes an implementation of shell mapping for a trellis code that is a 4D 16-state Wei code where the frame size is N=8.

An L-point signal constellation B is partitioned into four subsets $B_0, B_1, B_2, B_3$ according to Ungerboeck set partitioning principles, as is known in the art. B is also partitioned into M equal-sized "rings", where ring 0 contains the $2^u$ least-energy points from each subset, ring 1 contains the $2^u$ next lowest energy points, and so forth up to ring M-1. It follows, as above, that $L=M*2^{u+2}$.

In this example, where there are I input bits per frame of 8 symbols, 12 input bits of the I bits are used as the 4D/16-state encoder input, and 8u bits, u an integer, are used as uncoded bits. After encoding, 4 redundant bits are added such that there are a total of $J=I+4$ bits. As shown in FIG. 2, numeral 200, a block diagram of a shell mapper as is known in the art, from the J bits, $K=J-8(u+2)$ bits are used as the input to a shell mapper (202) to select the ring labels $\{m_1, m_2, \ldots, m_8\}$. Two bits per symbol from the Wei coder (204), which includes differential encoding, select a subset $B_i$, and the remaining u bits per symbol select the signal point in the selected ring of a signal point map (206). To limit complexity, the integer u is selected such that K is as large as possible, but no larger than a predetermined limit $K_{max}$.

Selection of the ring labels $\{m_1, m_2, \ldots, m_8\}$ is very important in shell mapping. First, a cost is assigned to each ring, typically the cost $c(i)$ of the i'th ring being equal to its label i. The total cost of a combination of rings is the sum of the costs of the individual rings. There are $M^8$ ring combinations, but only $2K \leq M^8$ input bit combinations. The shell mapper (202) selects the $2K$ combinations that have the least total cost to minimize the average cost.

For example, where $G_1(z)$ is a generating function of costs of a single ring; i.e., $$G_1(z) = \Sigma_i a_1(i) z^i = 1 + z + z^2 + \ldots + z^{M-1}.$$

The coefficient $a_1(i)$ of $z^i$ represents the number of rings that have cost i; namely, $a_1(i)=1$ if $0 \leq i \leq M-1$, and $a_1(i)=0$ otherwise. Similarly, where $G_{2j}(z)$ be the generating function of costs of $2^j$-ring combinations, where $j=1$, 2 or 3; i.e., $$G_{2j}(z) = \Sigma_i a_{2j}(i) z^i,$$

it is seen that $$G_8(z) = [G_4(z)]^2 = [G_2(z)]^4 = [G_1(z)]^8.$$

$z_8(i)$ is defined as the number of eight-ring combinations with cost less than i:

$$z_8(i) = \Sigma 0 \leq j \leq a_8(j).$$

Where $a_2(i)$, $a_4(i)$ and $z_8(i)$ are precomputed and stored in memory, the following steps are utilized:

(1) Collect the K input bits and represent them as an integer X, $0 \leq X \leq 2^K - 1$.

(2) Find the largest integer $C_8$, $0 \leq C_8 \leq 8(M-1)$, for which $z_8(C_8) \leq X$. This can be done by a binary search through the table for $z_8(i)$. The value $C_8$ is the total cost of $(m_1, m_2, \ldots, m_8)$.

(3) Compute the residue $R_8 = X - z_8(C_8)$, where $0 \leq R_8 \leq g_8(C_8) - 1$. Then use $C_8$ and $R_8$ to determine $(m_1, m_2, \ldots, m_8)$ as follows:

First, split $C_8$ into $C_{41}$ and $C_{42}$, which are the total costs of $(m_1, m_2, m_3, m_4)$ and $(m_5, m_6, m_7, m_8)$, respectively. Since $C_{41} + C_{42} = C_8$, the following combinations are obtained:

| $C_{41}$ | $C_{42}$ | Number of Combinations |
|---|---|---|
| 0 | $C_8$ | $a_4(0)a_4(C_8)$ |
| 1 | $C_8 - 1$ | $a_4(1)a_4(C_8 - 1)$ |
| 2 | $C_8 - 2$ | $a_4(2)a_4(C_8 - 2)$ |
| ... | | |
| $C_8$ | 0 | $a_4(C_8)a_4(0)$ |

It follows that if the convolution terms $a_4(0)a_4(C_8)$, $a_4(1)a_4(C_8-1), \ldots$, are subtracted from $R_8$ in sequence according to $$R_8 = R_8 - a_4(s)a_4(C_8 - s), s=0, 1, \ldots, C_8,$$

then within at most $C_8 + 1$ iterations $R_8$ will become negative (similar to FIR filtering). When $R_8 < 0$, the value of s is recorded as $C_{41}$ and $C_8 - s$ is denoted as $C_{42}$. $C_{41}$ and $C_{42}$ represent the costs of the four-tuples $(m_1, m_2, m_3, m_4)$ and $(m_5, m_6, m_7, m_8)$, respectively. Then the last term $a_4(C_{41})a_4(C_{42})$ is added to $R_8$ to obtain the new residue $R_4$, $0 \leq R_4 \leq a_4(C_{41})a_4(C_{42}) - 1$, and $R_4$ is represented as:

$$R_4 = R_{42} a_4(C_{41}) + R_{41}$$

where $0 \leq R_{41} \leq a_4(C_{41}) - 1$ and $0 \leq R_{42} \leq a_4(C_{42}) - 1$. $R_{41}$ and $R_{42}$ are obtained by dividing $R_4$ by $a_4(C_{41})$. The quotient is $R_{42}$ and the remainder is $R_{41} = R_4 - R_{42} a_4(C_{41})$.

To obtain the four-tuple $(m_1, m_2, m_3, m_4)$ from the residue $R_{41}$ and the cost $C_{41}$. $C_{41}$ is split into two components, $C_{211}$ and $C_{212}$, which are the costs of the two-tuples $(m_1, m_2)$ and $(m_3, m_4)$, respectively.

Since $G_4(z)$ is the convolution of $G_2(z)$ with itself, the procedure above can be used; i.e., subtract from $R_{41}$ the convolution terms $a_2(0)a_2(C_{41})$, $a_2(1)a_2(C_{41}-1)$, ... in sequence according to $$R_{41} = R_{41} - a_2(j)a_2(C_{41} - j), j=0, 1, \ldots, C_{41},$$

until $R_{41}$ becomes negative (within at most $C_{41}+1$ iterations). Then the values of j and $C_{41} - j$ are recorded as $C_{211}$ and $C_{212}$ the costs of the pairs $(m_1, m_2)$ and $(m_3, m_4)$, respectively. The last term $a_2(C_{211})a_2(C_{212})$ is added back to $R_{41}$ to obtain the new residue $R_{21}$, $0 \leq R_{21} \leq a_2(C_{211})a_2(C_{212}) - 1$. $R_{21}$ is then represented in the form $$R_{21} = R_{212} a_2(C_{211}) + R_{211}$$

where $0 < R_{211} \leq a_2(C_{211}) - 1$ and $0 \leq R_{212} \leq a_2(C_{212}) - 1$. The quantities $R_{211}$ and $R_{212}$ are obtained, as before, by dividing $R_{21}$ by $a_2(C_{211})$.

Determining the rings $(m_1, m_2, m_3, m_4)$ is now straightforward; since $a_1(i)=1$, $0 \leq i \leq M-1$, it is clear that:

(a) If $C_{211} \leq M-1$, then $m_1 = R_{211}$ and $m_2 = C_{211} - R_{211}$.

(b) If $M-1 \leq C_{211} \leq 2(M-1)$, then $m_1 = C_{211} - (M-1) + R_{211}$ and $m_2 = M-1-R_{211}$.

(c) If $C_{212} \leq M-1$, then $m_3 = R_{212}$ and $m_4 = C_{212} - R_{212}$.

(d) If $M-1 < C_{212} \leq 2(M-1)$, then, $m_3 = C_{212} - (M-1) + R_{212}$ and $m_4 - M - 1 - R_{212}$.

Similarly, the four-tuple $(m_5, m_6, m_7, m_8)$ may be obtained from $R_{42}$ and $C_{42}$.

Thus, the original K bits are uniquely recovered in a receiver from the received eight-tuple $(m_1, m_2, \ldots, m_8)$. The operation of the decoder is easily derived from that of the encoder.

FIG. 3, numeral 300, is a block diagram of a 4-dimensional/16-state encoder that is configured for shell mapping with $N=8$, as is known in the art. In this embodiment of shell mapping, which is suitable for the shell mapping portion of the present invention, two bits per symbol from the convolutional encoder (302, 304, 306, 308) select the subset A, B C or D. Then the shell mapper (310) utilizes K bits per frame of eight symbols to generate 8 ring indices for selecting rings, and the remaining u bits per symbol select the signal point in the appropriate subset within the selected ring.

FIG. 4, numeral 400, is a flow chart showing the steps of an embodiment of the frame-mapping method of the present invention. The frame-mapping method is utilized for mapping N-symbol frames of data, N a predetermined integer.

The first step (402) is selecting a number of bits for each frame to be one of: J-1, J, where J is an integer such that $J-1<Q\leq J$, where $Q=N*B/S$, B is a predetermined bit rate, and S is a predetermined symbol rate. Then, in frames of J-1 bits, a zero is inserted (404) in a most significant bit (MSB) position. A signal constellation is selected (406) with at least $2^J$ possible signal combinations per N symbols. Then, the frame bits are mapped (408) such that for MSB-0, one of the $2^{J-1}$ least energy combinations of N points is selected from the signal constellation such that the averaged energy is minimized. Note that when Q is an integer, Q=J, and all the frames have J bits. Thus, the mapping reduces to conventional frame mapping for integer number of bits per frame.

When using shell mapping, among J bits, K=J-N,v bits are used for shell mapping which generates N ring indices ranging from 0 to M-1. In each symbol, one of these ring indices is used to choose one of the M rings in the signal constellation, and v bits ($v\leq 0$, an integer) are used to choose one of the $2^v$ points within that ring. Among v bits, c bits ($c\leq 0$, an integer) are coding bits which are the output of the convolutional encoder, and are used to select one of the $2^c$ subsets, and the remaining u=v-c bits ($u\leq 0$, an integer) are used to select one of the $2^u$ points in the chosen subset in the chosen ring.

Choosing a large K will normally increase the complexity of the shell mapping scheme. Usually, K is limited to less than or equal to $K_{max}$. The typical values for $K_{max}$ are, for example, 15 or 31. In cases where J is large, K is kept to be less than or equal to $K_{max}$ by selecting a large u. Thus, if B is a two-dimensional signal constellation with $L=M*2^{u+c}$ points, where M is an integer such that $2^{K/N}\leq M$. $M_{min}$ is defined to be the minimum value for the integer M. M may be selected such that $M>M_{min}$ to obtain more shaping gain and such that $M=M_{min}$ to obtain the smallest constellation size. Selecting a different value for M allows a trade-off between shaping gain and constellation size.

In the embodiment of the method of the present invention, Q is a fractional bits per symbol rate. When the frame-mapping method is shell mapping, the signal constellation is divided into M equal size rings each of which has $2^v$ ($v\leq 0$, a predetermined integer) points. In this embodiment, the number of bits in each frame is one of: J-1 and J.

Where J-1 is the number of bits in the frame, K-1 (K=J-N*v, a predetermined integer) bits, together with a zero as the MSB, are utilized for shell mapping, to obtain N ring indices ranging from 0 to M-1 (M an integer) such that an averaged sum of N ring indices obtained in shell mapping is minimized, thereby minimizing average signal power. Where J is the number of bits in the frame, K bits are utilized for shell mapping to obtain N ring indices.

FIG. 5, numeral 500, is a block diagram of a frame-mapping device in accordance with the embodiment of the present invention. The frame-mapping device maps N-symbol frames of data, N a predetermined integer, such that a fractional number of bits per frame can be transmitted without constellation switching, and includes a frame selector (502), a zero insertion unit (504), and a signal constellation selector/mapper (506). The frame selector (502) is operably coupled to receive the data, for selecting a number of bits for each frame to be one of: J-1, J, where J is an integer such that $J-1\leq Q<J$, where $Q=N*B/S$, B is a predetermined bit rate, and S is a predetermined symbol rate. The zero insertion unit (504) is operably coupled to the frame selector (502), for, in frames of J-1 bits, inserting a zero in a most significant bit (MSB) position. The signal constellation selector/mapper (506) is operably coupled to the zero insertion unit (504), for selecting a signal constellation with at least $2^J$ possible signal combinations per N symbols, and mapping the frame bits such that for MSB=0, one of the $2^{J-1}$ least energy N-point combinations is chosen from the signal constellation so that the average energy is minimized. The frame-mapping device operates in accordance with the frame-mapping method described above.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

I claim:

1. A frame-mapping method for mapping N-symbol frames of data, N a predetermined integer (N>1), such that a fractional number Q of bits per frame can be transmitted without constellation switching, comprising the steps of:

A) selecting a number of bits for each frame to be one of: J-1, J, where J is an integer such that $J-1<Q<J$, where $Q=N*B/S$, B is a predetermined bit rate, and S is a predetermined symbol rate, B) in frames of J-1 bits, inserting a zero in a most significant bit (MSB) position, C) selecting a signal constellation with $2^J$ possible signal combinations per N symbols, and D) mapping the frame bits such that for MSB=0, one of the $2^{J-1}$ N-point combinations with least average energy is selected from the signal constellation.

2. The frame-mapping method of claim 1 wherein:

A) the frame-mapping method is shell mapping,

B) the signal constellation is divided into M equal size rings, M an integer, each of which has $2^v$ ($v\leq 0$ a predetermined integer) points, and C) the number of bits in each frame is one of: J-1 and J, D) where J-1 is the number of bits in the frame, K-1 (K=J-N*v) bits, together with a zero as the MSB, are utilized for shell mapping, to obtain N ring indices ranging from 0 to M-1 (M being an integer) such that an average sum of N ring indices obtained in shell mapping is minimized, thereby minimizing average signal power, and E) where J is the total number of bits in the frame, K bits are utilized for shell mapping to obtain N ring indices.

3. A frame-mapping device for mapping N-symbol frames of data, N a predetermined integer (N>1), such that a fractional number of bits per frame can be transmitted without constellation switching, comprising:

A) a frame selector, operably coupled to receive the data, for selecting a number of bits for each frame of data to be one of: J-1, J, where J is an integer such that $J-1<Q\leq J$, where $Q=N*B/S$, B is a predetermined bit rate, and S is a predetermined symbol rate, B) a zero insertion unit, operably coupled to the frame selector, for, in frames of J-1 bits, inserting a zero in a most significant bit (MSB) position, C) a signal constellation selector/mapper, operably coupled to the zero insertion unit, for selecting a signal constellation with at least $2^J$ possible signal combinations per N symbols, and mapping the frame bits such that for MSB=0, one of $2^{J-1}$ combinations of N points with least average energy is selected from the signal constellation.

4. The frame-mapping device of claim 3 wherein:

A) the frame-mapping device is a shell mapper,

B) the signal constellation is divided into M equal size rings. M an integer, each of which has $2^v$ ($v \geq 0$, a predetermined integer) points, and C) the number of bits in each frame is one of: J-1 and J, D) where J-1 is the number of bits in the frame, K-1 (K=J-N*y, an integer) bits, together with a zero as the MSB, are utilized for shell mapping, to obtain N ring indices, the indices ranging from 0 to M-1 (M being an integer) such that an average sum of N ring indices obtained in shell mapping is minimized, thereby minimizing average signal power, and E) where J is the total number of bits in the frame, K bits are utilized for shell mapping to obtain N ring indices.

5. A frame-mapping method for mapping successive frames of data to groups of N symbols, N a predetermined integer (N>1), such that, on average, a fractional number Q of bits are mappable per frame without constellation switching, comprising the steps of:

A) selecting a number of bits for each frame to be one of: J-1, J, where J is an integer such that J-1<Q<J, according to a predetermined pattern, B) in frames of J-1 bits, inserting a zero in a most significant bit (MSB) position, C) selecting a set of $2^J$ possible combinations of N symbols, where each symbol is chosen from a signal constellation and D) mapping the frame bits such that for MSB=0, one of the $2^{J-1}$ possible combinations of N symbols of least average energy is selected from the $2^J$ possible combinations.

6. The frame-mapping method of claim 5 wherein:

A) the frame-mapping method is shell mapping,

B) the signal constellation is divided into M equal size rings, M an integer, each of which has $2^v$ ($v>0$ a predetermined integer) points, and C) where in frames of J-1 bits, K-1 (K=J-N*v) bits, together with a zero as the MSB, are utilized for shell mapping, to obtain N ring indices ranging from 0 to M-1 such that an average sum of N ring indices obtained in shell mapping is kept small, thereby keeping the average signal power small, and D) where in frames of J bits, K bits are utilized for shell mapping to obtain N ring indices.

7. A frame-mapping device for mapping successive frames of data to groups of N symbols, N a predetermined integer (N>1), such that, on average, a fractional number Q of bits are mappable per frame without constellation switching, comprising:

A) a frame selector, operably coupled to receive the data, for selecting a number of bits for each frame of data to be one of: J-1, J, where J is an integer such that J-1<Q<J, according to a predetermined pattern, B) a zero insertion unit, operably coupled to the frame selector, for, in frames of J-1 bits, inserting a zero in a most significant bit (MSB) position, C) a signal constellation selector/mapper, operably coupled to the zero insertion unit, for selecting a set of $2^J$ possible combinations of N symbols, where each symbol is chosen from a signal constellation, and mapping the frame bits such that for MSB=0, one of $2^{J-1}$ possible combinations of N symbols of least average energy is selected from the set of $2^J$ possible combinations.

8. The frame-mapping device of claim 7 wherein:

A) the frame-mapping device is a shell mapper,

B) the number of bits in each frame is one of: J-1 and J,

C) where in frames of J-1 bits, K-1 (K=J*N-v) bits, together with a zero as the MSB, are utilized for shell mapping to obtain N ring indices ranging from 0 to M-1 (M being an integer) such that an average sum of N ring indices obtained in shell mapping is minimized, thereby minimizing an average signal power, and D) where in frames having a total of J bits, K bits are utilized for shell mapping to obtain N ring indices.

* * * * *

UNITED STATES PATENT AND TRADEMARK OFFICE
CERTIFICATE OF CORRECTION

PATENT NO. : 5,428,641
DATED : Jun. 27, 1995
INVENTOR(S) : Guozhu Long, Canton, Mass.

It is certified that error appears in the above-indentified patent and that said Letters Patent is hereby corrected as shown below:

Column 5:

line 16 reads "2K"  should read "$2^K$"

line 17 reads "2K"  should read "$2^K$"

line 23 reads "$= \Sigma_i \, a_f(i) z^1$"  should read "$= \Sigma_i \, a_f(i) z^i$"

Column 7:

line 23 reads " K= J-N,v "  should read " $K = J-N*v$ "

line 27 reads " (v $\leq$ 0, an interger)"  should read "(v $\geq$ 0, an interger) "

line 29 reads " (c $\leq$ 0, an interger)"  should read "(c $\geq$ 0, an interger) "

line 32 reads " (u $\leq$ 0, an interger)"  should read "(u $\geq$ 0, an interger) "

UNITED STATES PATENT AND TRADEMARK OFFICE
CERTIFICATE OF CORRECTION

PATENT NO. : 5,428,641
DATED : Jun. 27, 1995
INVENTOR(S) : Guozhu Long, Canton, Mass.

It is certified that error appears in the above-indentified patent and that said Letters Patent is hereby corrected as shown below:

Column 8:

line 47 reads " ($v \leq 0$, a predetermined"    should read "($v \geq 0$, a predetermined "

Column 9 line 21 reads "K=J-N*y"    should read "K=J-N*v"

Column 10 line 39 reads "K=J*N-v"    should read "K=J-N*v"

Signed and Sealed this

Twenty-eighth Day of January, 1997

Attest:

BRUCE LEHMAN

Attesting Officer    Commissioner of Patents and Trademarks